3,387,314
OIL GAUGE CLEANER
Marion Shirk, 504 Wonsley Drive,
Austin, Tex. 78753
Filed Oct. 20, 1966, Ser. No. 588,683
1 Claim. (Cl. 15—210)

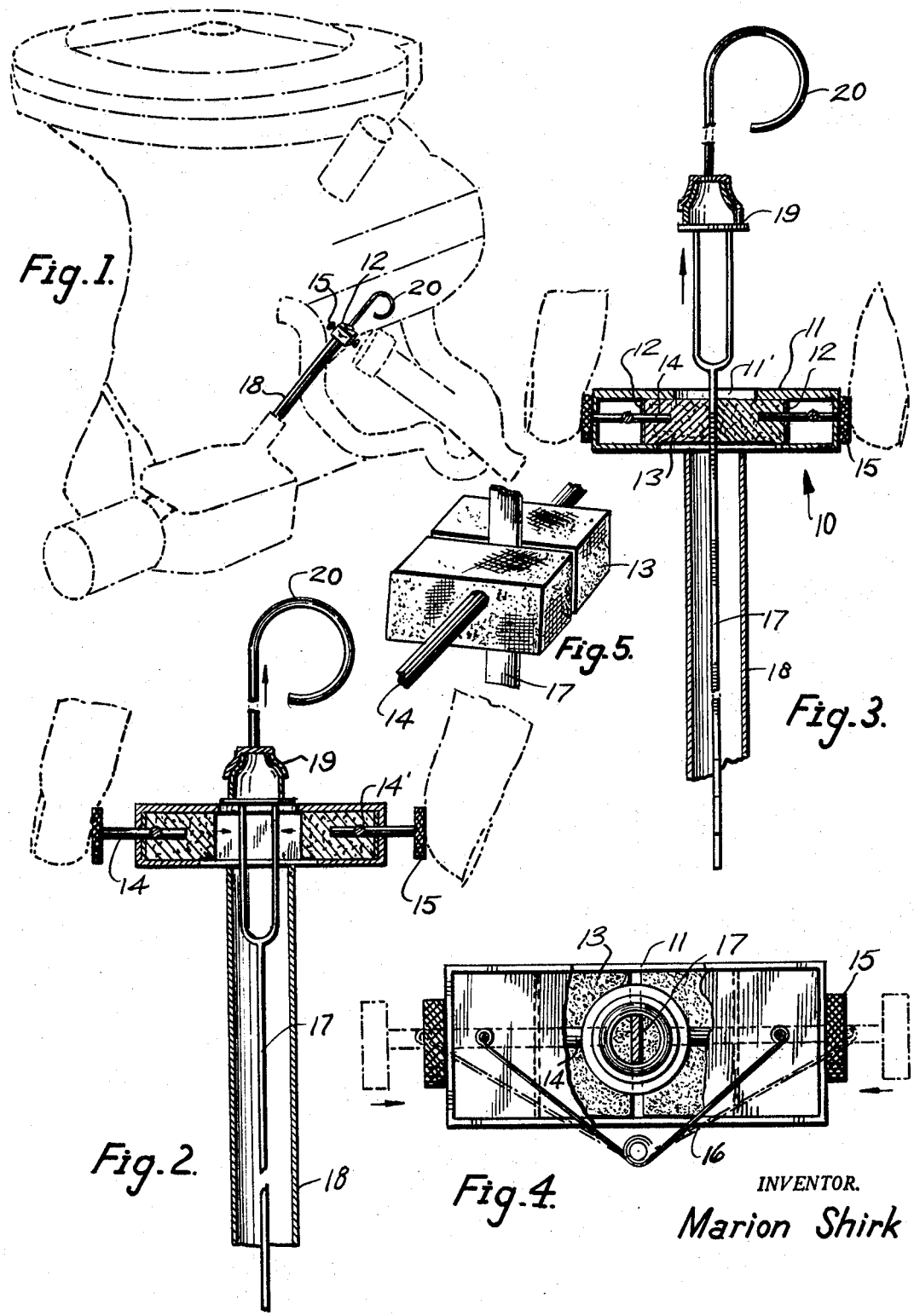

ABSTRACT OF THE DISCLOSURE

A device securable to an engine block, and fitted around an oil dip stick gauge, the device comprising a housing enclosing a pair of felt wipers normally retained in spaced apart relation by means of a spring, the felt wipers being manually urged toward each other so to wipe off a dip stick gauge slideable therebetween, thereby eliminating the necessity of requiring extra rags or papers for cleaning off the same prior to taking an oil level reading.

---

This invention relates to oil gauges and more particularly an oil gauge cleaner.

It is therefore the main purpose of this invention to provide an oil gauge cleaner which entirely eliminates the need for paper, rags, or the like for cleaning the gauge rod before returning it to the crank case so that the oil level may be measured.

Another object of this invention is to provide an oil gauge cleaner which may be removably secured to the upper end of an oil filler tube and utilized to instantaneously wipe off oil particles of the gauge rod when said rod is being withdrawn from said tube.

Another object of this invention is to provide an oil gauge cleaner which is suitably adapted to be used with gauge rods of various sizes and shapes of any automobile, tractor, truck or the like.

Still another object of this invention is to provide an oil gauge cleaner which is inexpensive to manufacture, may be moderately priced, is safe to use, is of rugged construction, and provides maximum utility to the motorist.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all inch variations and modifications as fall within the spirit of the invention and the scope of the appended claim.

In the drawing:

FIGURE 1 is an illustration showing the invention in its operative use.

FIGURE 2 is a sectional view of this invention showing the felt wipers in their inoperative state.

FIGURE 3 is a sectional view of this invention showing the felt wipers in operative position.

FIGURE 4 is a top fragmentary view of this invention showing the expansion and contraction of the spring member in accordance with the principles of this invention.

FIGURE 5 is a fragmentary perspective view showing the oil gauge rod being moved through the felt wipers in accordance with the underlying principles of this invention.

According to this invention, an oil gauge cleaner 10 is provided with a housing 11 which includes a cylindrical hole at the top portion thereof. A pair of vertically disposed plates are movably positioned within said housing 11. Each plate 12 is operably communicating, that is, secured with felt wiper 13 of block-like configuration. Each plate 12 receives a perpendicularly disposed shaft or pin 14 which extends into felt wiper 13 and is positioned with an outwardly disposed projection 14' suited to receive the end portion of spring 16. The end portion of each shaft is provided with a push button 15 which, in cooperation with spring 16 is capable of retractably moving felt wiper 13 within housing 11.

It will also be noted that, in operation, when cap member 19 is dislodged from hole 14' of the housing 11 and gauge rod 17 is raised upwardly, push buttons 15, on each side of housing 11, may be depressed inwardly so that the front end of each felt wiper 13 abuts each side of gauge rod 17. Therefore, when rod 17 is removed, by means of handle 20, from the oil filler tube 18 rod 17—due to the wiping action of felt wipers 13—will not show even the slightest amount of oil or any other foreign matter on the gauge rod 17. When it is desired, after oil level measurements, to reposition rod 17 within filler tube 18, the push buttons 15 are released thus causing removal of each oil wiper 13 from the passage or inlet of filler tube 18. This is achieved due to the outward expansion of V-shaped spring member 16 which is designed to operably communicate with the movements of each shaft 15.

What I now claim is:

1. An oil gauge wiper, comprising in combination, a box configurated housing, said housing including a top wall, a bottom wall, and opposite end walls, said top and bottom walls each having a central opening in alignment with each other, an oil gauge rod extending through said opening and through said housing, a pair of felt wipers within said housing, said wipers being positioned on opposite sides of said oil gauge rod, one side of each of said felt wipers being accordingly in position for wiping off oil from said gauge rod when said felt wipers are urged toward each other, the opposite side of each said felt wipers having a pressure plate adjacent thereto with a horizontal shaft extending therethrough, one end of said shaft being located within the center of each said felt wiper, the opposite end of said shaft extending through an opening of each said end wall, the outer end of said shaft having a knob secured thereto, said knob providing a means for manually urging each of said felt wipers toward each other and toward the opposite side of said gage rod for wiping off oil therefrom, an intermediate portion of each said shaft being secured to a terminal end of a V-configurated compression spring which normally urges said shafts and said felt wipers apart, and said bottom wall of said housing being secured to the upper end of an oil filler tube of a motor housing.

References Cited

UNITED STATES PATENTS 2,855,682  10/1958  Norgard _____ 33—126.7
3,098,254   7/1963  Rose _____ 15—210.2

CHARLES A. WILLMUTH, *Primary Examiner.*

LEON MACHLIN, *Assistant Examiner.*